US006842302B2

(12) United States Patent
Nakajima et al.

(10) Patent No.: US 6,842,302 B2
(45) Date of Patent: *Jan. 11, 2005

(54) ND FILTER, METHOD FOR PRODUCING THE ND FILTER, AND APERTURE DEVICE INCLUDING THE ND FILTER

(75) Inventors: Katsura Nakajima, Nirasaki (JP); Kazuhiro Fukasawa, Minamialps (JP); Nobutaka Kumada, Odawara (JP)

(73) Assignee: Nisca Corporation, Yamanashi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/600,531

(22) Filed: Jun. 23, 2003

(65) Prior Publication Data

US 2004/0008439 A1 Jan. 15, 2004

(30) Foreign Application Priority Data

Jun. 28, 2002 (JP) ........................................ 2002-190719

(51) Int. Cl.$^7$ ................................................ G02B 5/22
(52) U.S. Cl. ........................ 359/888; 359/885; 396/108
(58) Field of Search ................................ 359/885, 888, 359/889, 892; 396/108, 544; 427/385.5

(56) References Cited

U.S. PATENT DOCUMENTS

| 3,897,140 | A | * | 7/1975 | Tuthill ........................ 359/888 |
| 5,715,103 | A | * | 2/1998 | Amano et al. ............... 359/888 |
| 5,726,797 | A | * | 3/1998 | Zhang et al. ................ 359/350 |
| 6,671,109 | B2 | * | 12/2003 | Kunii .......................... 359/888 |
| 2003/0008136 | A1 | * | 1/2003 | Bliznyuk et al. ........... 428/336 |
| 2004/0021967 | A1 | * | 2/2004 | Yanagi et al. ............... 359/885 |

FOREIGN PATENT DOCUMENTS

JP 10-133253 * 5/1998

* cited by examiner

Primary Examiner—Leo Boutsikaris
(74) Attorney, Agent, or Firm—Manabu Kanesaka

(57) ABSTRACT

An ND filter includes a substrate formed in a plastic sheet and a deposited film formed on a surface of the substrate. The plastic sheet has at least 120° C. of a glass transition temperature. In producing the ND filter, the deposited film is formed on the surface of the substrate at a temperature below the glass transition temperature of the plastic sheet to suppress deformation due to expansion and contraction and to prevent the plastic sheet from wrinkling.

7 Claims, 8 Drawing Sheets

ND FILTER, METHOD FOR PRODUCING THE ND FILTER, AND APERTURE DEVICE INCLUDING THE ND FILTER

BACKGROUND OF THE INVENTION AND RELATED ART STATEMENT

The present invention relates to an ND (neutral density) filter including a plastic sheet substrate and a deposited film formed on the substrate, a method for producing the ND filter, and an aperture device including the ND filter.

An aperture device used in a lens optical system such as a still camera and video camera includes an ND filter formed in a sheet to prevent hunting of an aperture blade and low resolution by diffraction at a small diaphragm opening. Lately, a resolution of a camera has been increased and a size of a camera has been decreased. In such cases, when an ND filter having a uniform light transmittance is used, it may be difficult to effectively prevent the diffraction due to a steep change in a light intensity when the filter enters the aperture opening. Accordingly, it has been proposed to provide an ND filter with various light transmittances changed stepwise.

An ND filter is generally disposed to be movable in a lens optical system. Therefore, it is necessary to use a thin and light material for the ND filter. The ND filter is generally formed in a plastic sheet, so that it is easy to form in a desired shape corresponding to an aperture opening. Such ND filters include a filter in which a plastic material containing an organic dye or pigment is formed in a sheet to provide a desired optical characteristic, and a filter in which a film is deposited on a surface of a transparent plastic material to provide a desired optical characteristic.

In particular, the filter having the deposited film exhibits a high anti-reflection effect at a surface of the filter through a combination of deposited layers. Thus, the filter is effective in reducing a ghost in the lens optical system. Further, it is possible to provide a filter having areas with various light transmittances changed stepwise, so that the film can reduce transmittance without a steep change in the transmittance, thereby preventing the diffraction more effectively.

In general, when the ND filter including a substrate sheet with a deposited film thereon is manufactured, a transparent plastic sheet having a predetermined size is placed in a vacuum chamber, and the deposited film is formed on a surface of the sheet with vacuum deposition, ion plating or sputtering. In the deposition process, in order to prevent curling of the plastic sheet, a periphery of the plastic sheet is fixed with a metal plate in the vacuum chamber, or the entire surface of the plastic sheet is fixed with a mask plate having many openings corresponding to the ND filters.

It is known that a plastic sheet is susceptible to heat. Accordingly, a temperature of the vacuum deposition chamber is maintained as low as possible. However, there is a case in which a plastic sheet is heated up to about 120° C. due to heat when an electron gun heats and melts a deposited material or when the plastic sheet is heated to securely adhere the deposited film to obtain a desired light transmittance.

As a conventional filter, Japanese Patent Publication (KOKAI) No. 10-133253 has disclosed an ND filter using a plastic sheet formed of polyethylene terephthalate (PET) and polyethylene naphthalate (PEN). These materials have a relatively low glass transition temperature of about 70° C. As shown in FIG. 8, when a plastic sheet 1 formed of PET or PEN is heated to about 120° C. in a state that the plastic sheet is fixed at a periphery of an opening 3 of a mask plate 2, it is possible to form wrinkles on the plastic sheet 1 along an edge of the opening 3. Such wrinkles may affect the refraction of light when the sheet is used as the ND filter.

In view of problems described above, an object of the present invention is to provide an ND filter including a plastic sheet having a high glass transition temperature so as to reduce deformation and wrinkles of the plastic sheet due to thermal expansion and shrinkage during the deposition process.

Another object of the present invention is to provide a method for producing the ND filter and an aperture device using the ND filter.

Further objects and advantages of the invention will be apparent from the following description of the invention.

SUMMARY OF THE INVENTION

In order to attain the objects described above, according to the present invention, an ND filter includes a substrate composed of a plastic sheet and a deposited film formed on a surface of the substrate. The substrate has a glass transition temperature of at least 120° C.

It is preferred that the plastic sheet has a visible light transmittance of at least 90% and turbidity of 0.5% or less. Further, the plastic sheet may be composed of a norbornene resin.

In the present invention, the plastic sheet has at least 120° C. in the glass transition temperature. Hence, it is possible to form the deposited film on the plastic sheet while heated at a temperature below the glass transition temperature in a vacuum chamber. As a result, the plastic sheet does not deform due to the thermal expansion and shrinkage, thereby preventing wrinkles on the sheet.

According to the present invention, a method for producing the ND filter includes the steps of placing a substrate composed of a plastic sheet in a vacuum chamber; evacuating the vacuum chamber to a predetermined degree of vacuum; and forming a deposited film on a surface of the substrate at a temperature below the glass transition temperature of the plastic sheet.

According to the present invention, an aperture device includes the ND filter including a substrate composed of a plastic sheet and a deposited film formed on a surface of the substrate. The substrate has at least 120° C. in the glass transition temperature.

DETAILED DESCRIPTION OF PREFERRED EMBODIMENTS

Figure 1:
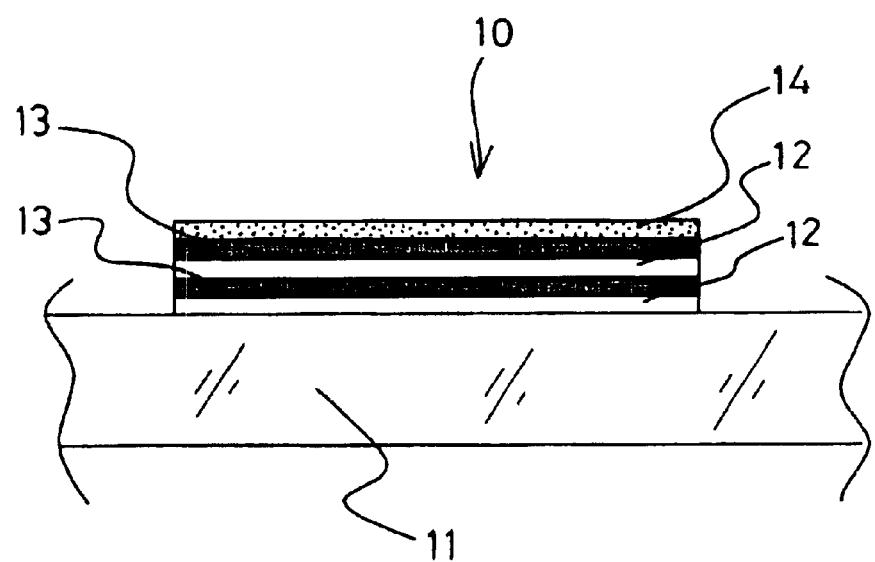
FIG. 1 is a cross-sectional view showing a structure of an ND filter according to the present invention.
Figure 2:
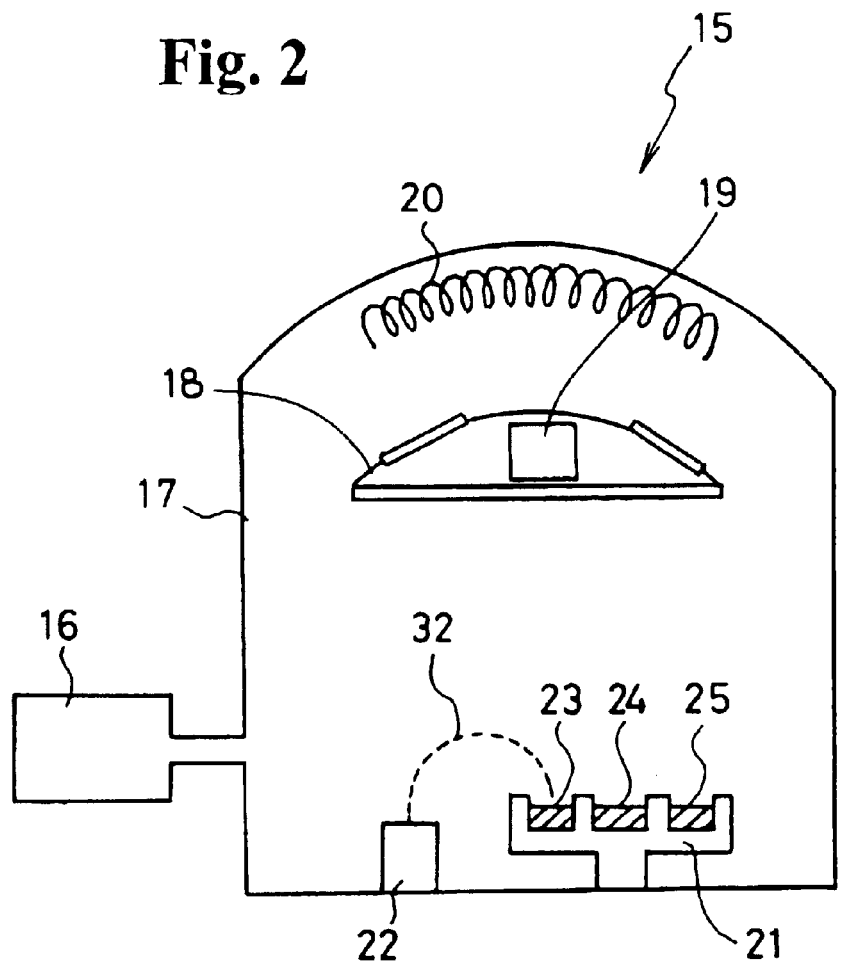
FIG. 2 is a schematic view of a vacuum deposition chamber for producing the ND filter according to the present invention.
Figure 3:
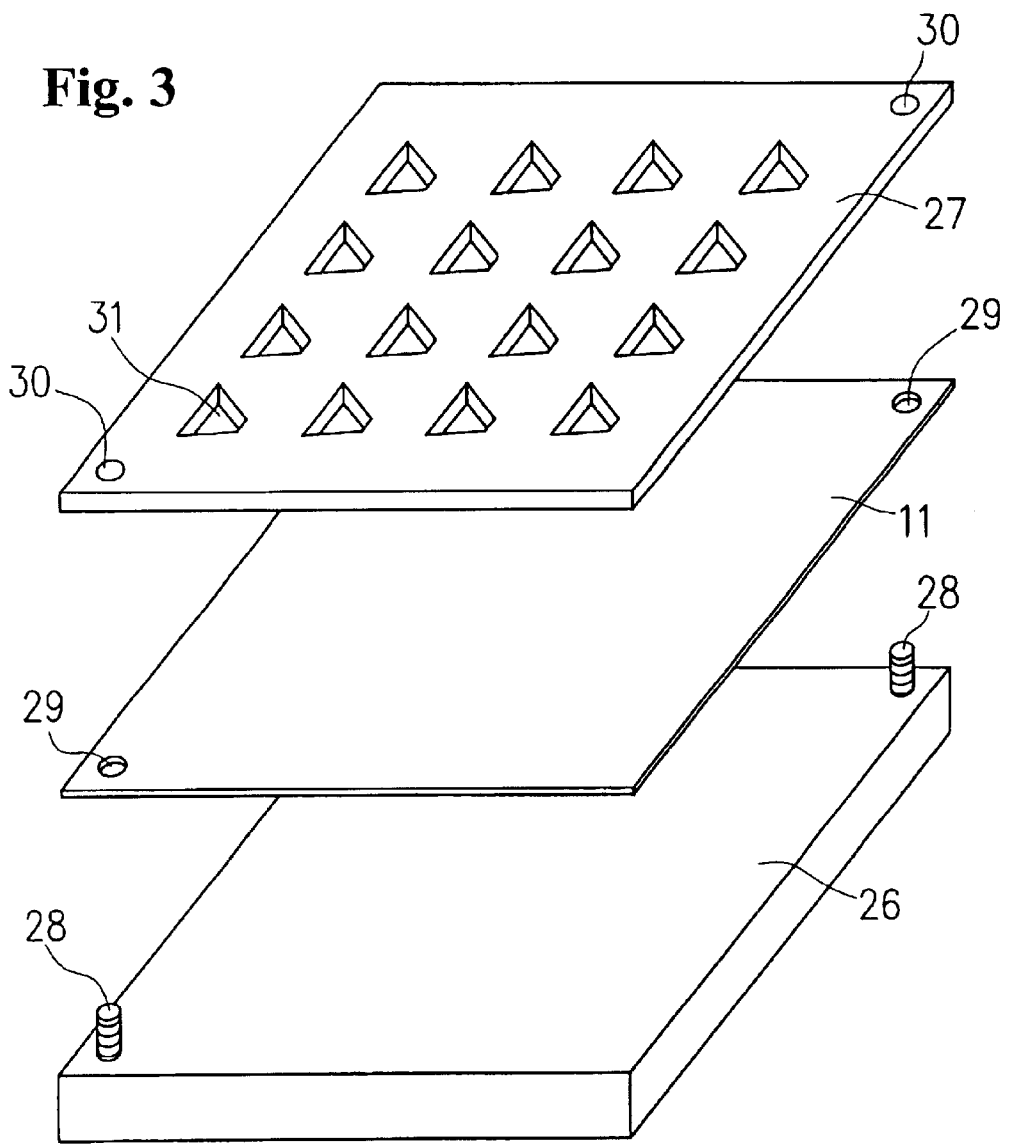
FIG. 3 is a perspective view showing a geometric relationship between a transparent plastic sheet and a mask plate relative to a fixing plate.

Hereunder, embodiments of the present invention will be described in detail with reference to the accompanying drawings. FIG. 1 is a cross-sectional view showing a structure of an ND filter according to the present invention; FIG. 2 is a schematic view of a vacuum deposition chamber for producing the ND filter according to the present invention; and FIG. 3 is a perspective view showing a geometric relationship between a transparent plastic sheet and a mask plate relative to a fixing plate.

As shown in FIG. 1, a transparent plastic sheet 11 as a substrate generally has a thickness in a range of about 25 µm to 200 µm, and preferably in a range of 50 µm to 100 µm. A sheet with a thickness less than 25 µm exhibits low rigidity, which causes delamination of a deposited film composed of a fragile dielectric material when the transparent plastic sheet 11 is bent. A sheet with a thickness larger than 200 µm exhibits high turbidity, which causes noticeable light scattering leading to flare in the optical system when the sheet is used as a filter.

In the present invention, it is necessary that the transparent plastic sheet 11 has at least 90% in light transmittance and 0.5% or less in a haze value (turbidity) for the optical filters. It is noted that the plastic material in the present invention has a high glass transition temperature, i.e. at least 120° C. As described above, the glass transition temperature is higher than a temperature of the transparent plastic sheet 11 heated in the vacuum chamber. Therefore, it is possible to effectively prevent wrinkles on the sheet. Materials satisfying such conditions include a polycarbonate resin and a norbornene resin or a material containing the norbornene resin. In particular, the norbornene resin has high transmittance, low turbidity, and low birefringence, and is suitable for the optical filters.

As shown in FIG. 1, according to the present invention, an ND filter 10 includes the transparent plastic sheet 11. A Chromel layer 12 and a silicon dioxide ($SiO_2$) layer 13 are alternately deposited on the substrate. A hard magnesium fluoride ($MgF_2$) layer 14 is formed on the top.

The deposited films may be formed with vacuum deposition, ion plating, or sputtering. The films preferably have a thickness in a range of about 0.5 µm to 1.0 µm. The Chromel layer 12 is formed of a deposition material composed of 90% nickel and 10% chromium, and is formed in a colored deposit film with a light absorption characteristic. It is possible to adjust the light transmittance through the thickness of each film and the number of the films deposited. An alloy of nickel and chromium other than Chromel may be used for forming the deposited film having optical characteristics similar to those of the Chromel film. In particular, an alloy containing at least 90% nickel is preferred.

The silicon dioxide film 13 has an anti-reflection effect, and a combination of the Chromel film 12 and the silicon dioxide film 13 can surely prevent reflection in the visible wavelength region. The uppermost hard magnesium fluoride film 14 provides the surface hardness of the ND filter 10 at a required level.

A method for producing the ND filter according to the present invention will be described next with reference to a vacuum deposition chamber 15 shown in FIG. 2. The vacuum deposition chamber 15 has a deposition chamber 17 connected to a vacuum pump 16. A hemispherical rotary table 18 is provided in an upper space in the deposition chamber 17, and a deposition member 19 is placed on the rotary table 18. A heater 20 is provided above the rotary table 18 to heat the deposition member 19. The deposition chamber 17 is also provided with a crucible 21 for retaining a deposition material at a bottom thereof and an electron gun 22 adjacent to the crucible 21. The crucible 21 has three recesses on an upper surface thereof for retaining granular deposition materials, i.e. Chromel 23, silicon dioxide 24, and magnesium fluoride 25.

As shown in FIG. 3, the deposition member 19 placed on the rotary table 18 includes a flat fixing plate 26 directly fixed to a surface of the rotary table 18, the transparent plastic sheet 11 having a size substantially the same as that of the flat fixing plate 26, and a mask plate 27 for holding the transparent plastic sheet 11 together with the flat fixing plate 26. The flat fixing plate 26 has bolts 28 at two diagonal corners, and the transparent plastic sheet 11 and the mask plate 27 have positioning holes 29 and 30 at positions corresponding to the bolts 28.

The mask plate 27 is provided with a plurality of openings 31 arranged in two-dimensional arrays and having a shape corresponding to that of the ND filter for producing a plurality of the ND filters. The transparent plastic sheet 11 and the mask plate 27 are placed and fixed to the flat fixing plate 26 in that order by screwing nuts (not shown) to the bolts 28, so that the mask plate 27 is closely attached to the transparent plastic sheet 11.

When the mask plate 27 is formed by a metal plate, it is possible to closely attach the mask plate 27 to the transparent plastic sheet 11 merely by placing on the transparent plastic sheet 11 with its own weight. It is possible to attach further closely by fastening with the bolts and nuts as described above, by using a spring, or by using a magnet between the flat fixing plate 26 and the mask plate 27. When the mask plate 27 closely contacts the transparent plastic sheet 11 in such a way, it is possible to effectively prevent the deposited film from smearing around a periphery of the opening 31.

After the deposition member 19 is placed on the rotary table 18, the deposition chamber 17 is sealed and evacuated by a vacuum pump 16 while the heater 20 heats the transparent plastic sheet 11 of the deposition member 19 up to about 120° C. After the vacuum in the deposition chamber 17 reaches a predetermined level, the electron gun 22 radiates an electron beam 32 to heat the Chromel 23 and the silicon dioxide 24 alternately so that these materials are alternately deposited on the deposition member 19. After repeating the deposition steps, the magnesium fluoride 25 is heated and deposited on the top surface of the deposition member 19. These materials are deposited in the order shown in FIG. 1 on the transparent plastic sheet 11 of the deposition member 19 only in regions defined by the openings 31 of the mask plate 27.

Figure 4A:
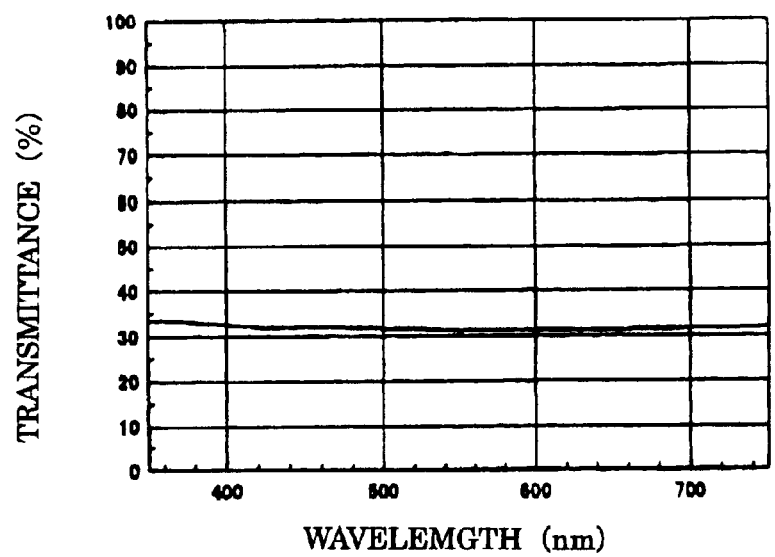
FIGS. 4(a) and 4(b) are graphs showing optical characteristics of the ND filter according to the present invention.
Figure 4B:
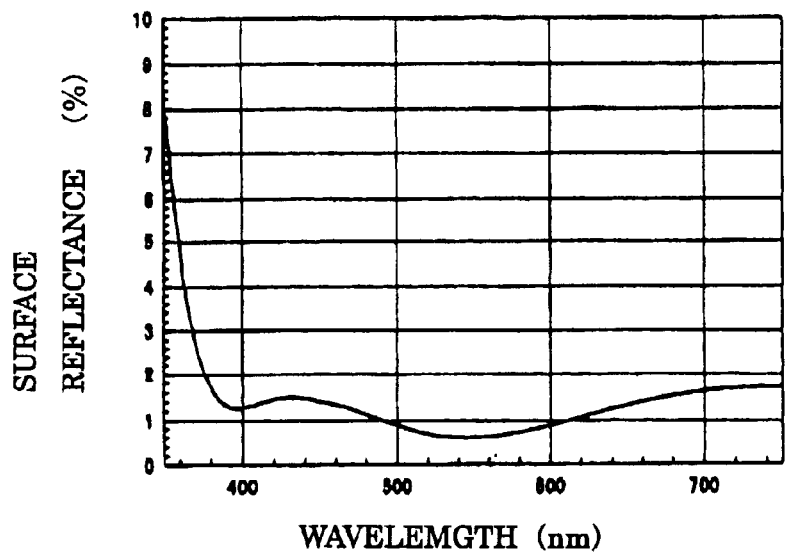

FIG. 4(a) is a graph showing a relationship between transmittance and wavelength of the deposited films, and FIG. 4(b) is a graph showing a relationship between surface reflectance and wavelength of the filter 10. The deposited films used in the measurement were simultaneously prepared in the process for preparing the ND filter 10. FIG. 4(a) shows that the transmittance is almost constant at about 30% over the wavelength range of 400 nm to 700 nm with no wavelength dependence. FIG. 4(b) shows that the surface reflectance is extremely low, i.e. 2% or less, over the wavelength range of 400 nm to 700 nm, and thus is a practical level.

Figure 5:
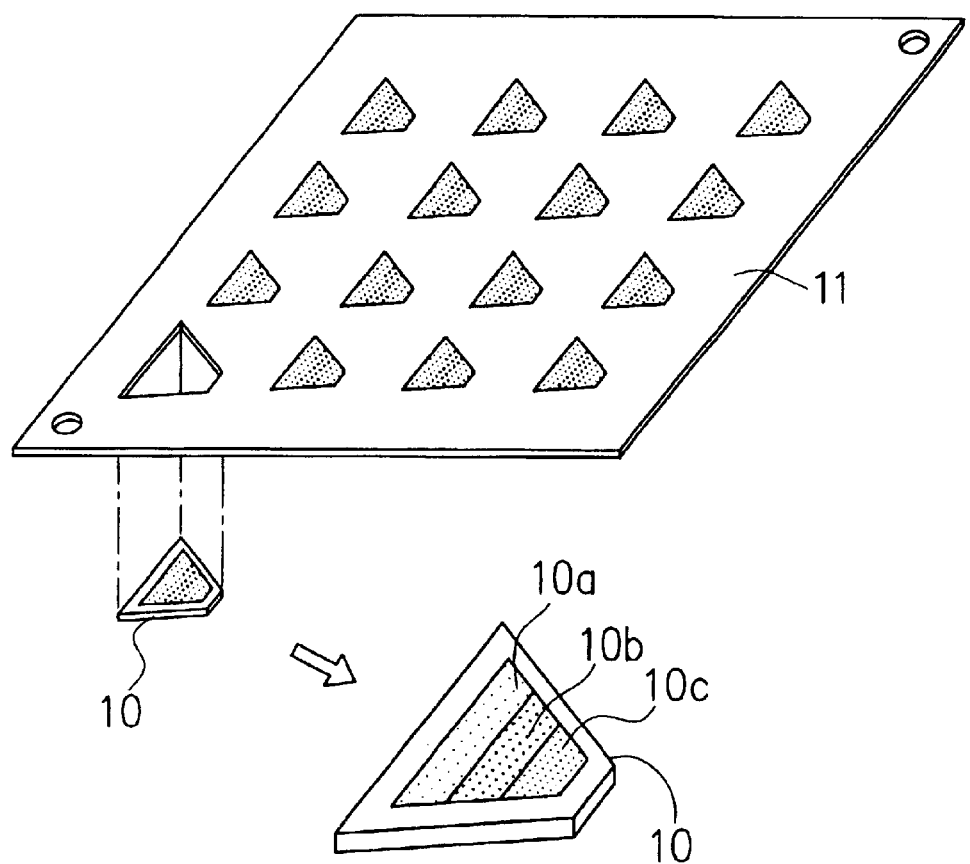
FIG. 5 is a perspective view showing a transparent plastic sheet on which a plurality of the ND filters with regions having different light transmittances is formed.
Figure 6:
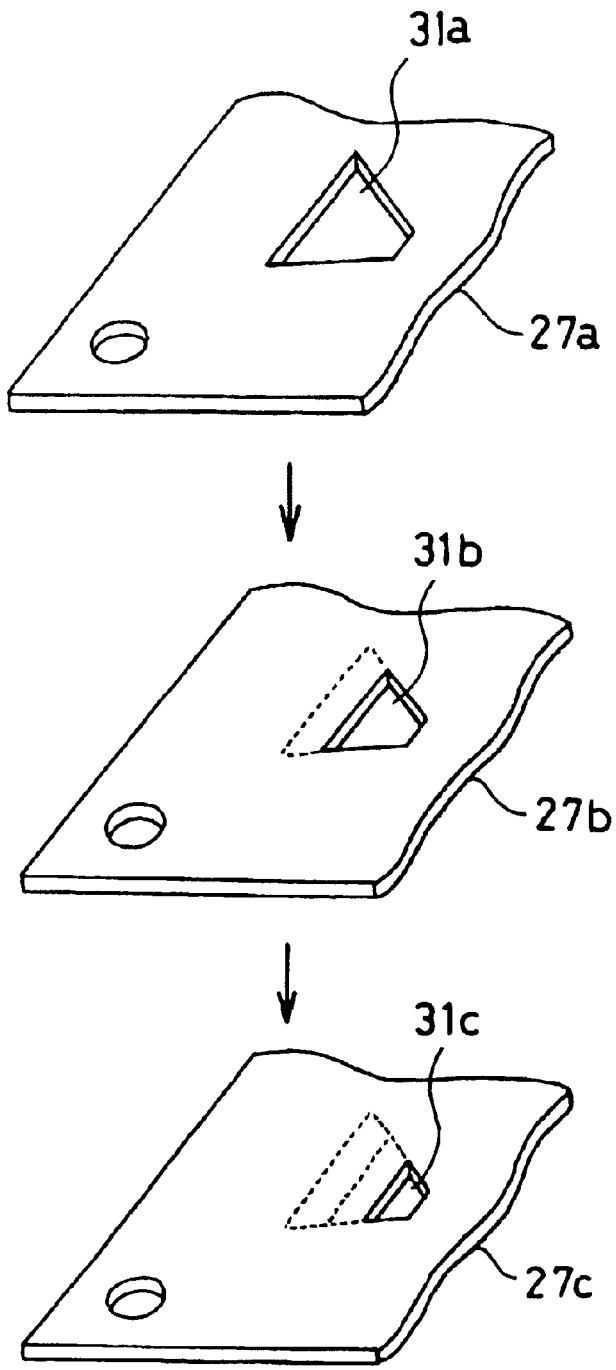
FIG. 6 is a schematic view showing three mask plates having openings with different shapes for producing the ND filter shown in FIG. 5.

FIG. 5 shows a transparent plastic sheet 11 on which a plurality of the ND filters with three different light transmittance regions is formed. As shown in FIG. 5, the ND filters 10 are formed by punching out portions provided with the deposited films. The ND filter 10 has three regions 10a, 10b, and 10c having different light transmittances, and may be formed, for example, through three mask plates 27a, 27b, and 27c shown in FIG. 6. The first mask plate 27a has an opening 31a corresponding to all three regions 10a, 10b, and 10c. The second mask plate 27b has an opening 31b corresponding to two regions 10b and 10c, and the third mask plate 27c has an opening 31c corresponding to only one region 10c.

In the first deposition step through the first mask plate 27a, all regions 10a, 10b, and 10c are subjected to the deposition. In the second deposition step through the second mask plate 27b, two regions 10b and 10c are subjected to the deposition. In the third deposition step through the third mask plate 27c, only the region 10c is subjected to the deposition. As a result, these three regions have different numbers of the deposit layers and different light transmittances stepwise.

In the production method according to the present invention, it is possible to perform the deposition at a temperature lower than the glass transition temperature of the transparent plastic sheet. Therefore, the plastic sheet does not deform easily due to the expansion and shrinkage, thereby preventing the wrinkles. When the sheet is used as the ND filter in the lens aperture device of a still camera or a video camera, the sheet does not adversely affect the light refraction.

Figure 7:
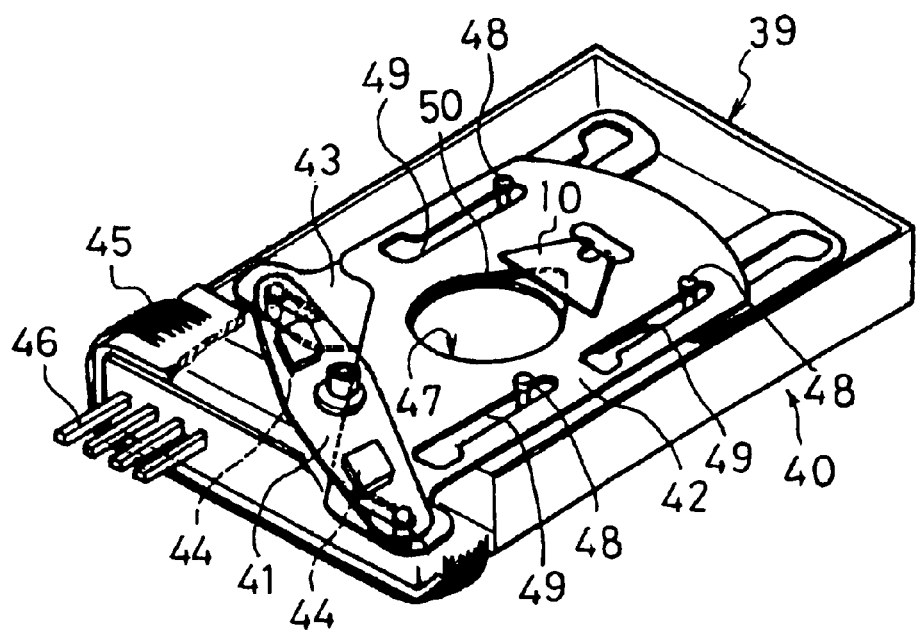
FIG. 7 is a perspective view showing an aperture device including the ND filter according to the present invention.
Figure 8:
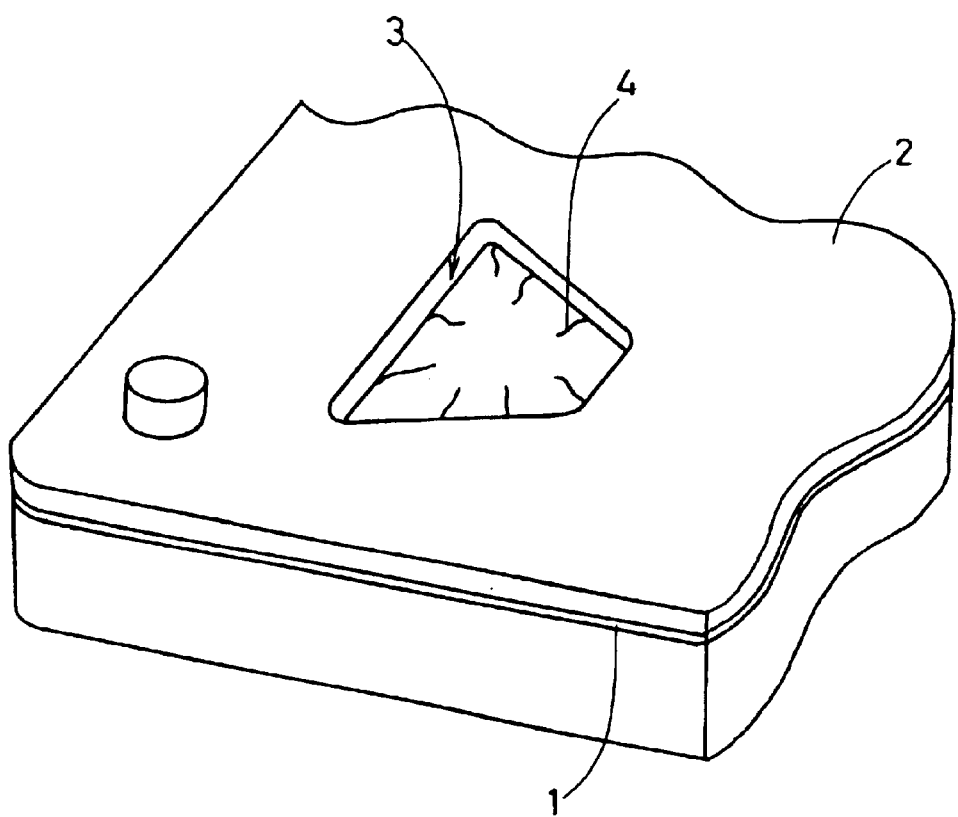
FIG. 8 is a perspective view showing wrinkles generated on an ND filter.

FIG. 7 shows an aperture device 39 provided with the ND filter 10 mounted in a compact video camera or digital camera for adjusting exposure. The aperture device 39 includes a base 40, an arm 41, the first aperture blade 42, the second aperture blade 43, a pair of magnets 44, an excitation coil unit 45 having a driving coil and a control coil, terminals for electrically connecting the driving coil and the control coil to an external device, and a magnetic sensor (not shown) for detecting a position of the magnet and an aperture ratio. The base 40 has an exposure hole 47 at the center thereof and guide pins 48 on the right and left sides thereof. These guide pins 48 control the aperture blades 42 and 43 to slide on the right and left sides.

Each of the first and second aperture blades 42 and 43 has a long slit 49 for guiding the guide pins 48 and an aperture opening 50 having a shape substantially the same as that of the exposure hole 47. The ND filter 10 is slidably disposed to partly cover the aperture opening 50. The first aperture blade 42 and the second aperture blade 43 are mutually slid to adjust the light intensity passing through the exposure hole 47. At a small diaphragm opening, the ND filter 10 slides toward the exposure hole 47 to slightly adjust the light transmittance of the exposure hole 47.

While the invention has been explained with reference to the specific embodiments of the invention, the explanation is illustrative and the invention is limited only by the appended claims.

What is claimed is:

1. An ND filter comprising:
    a substrate formed of a plastic sheet having a glass transition temperature of at least 120° C., at least 90% of visible light transmittance, and 0.5% or less of turbidity, and
    a deposit film formed on a surface of the substrate.

2. An ND filter according to claim 1, wherein said plastic sheet is formed of a material selected from the group consisting of polycarbonate resin and a norbornene resin.

3. An ND filter according to claim 1, wherein said deposit film includes a Chromel layer, a silicon dioxide layer, and magnesium fluoride layer.

4. An ND filter according to claim 3, wherein said Chromel layer and silicon dioxide layer are alternately deposited, and the magnesium fluoride layer is deposited on a top of the deposit film.

5. A method for producing an ND filter, comprising the steps of:
    placing a substrate formed of a plastic sheet having a glass transition temperature of at least 120° C., at least 90% of visible light transmittance, and 0.5% or less of turbidity in a vacuum chamber,
    evacuating the vacuum chamber to a predetermined degree of vacuum, and
    forming a deposit film on a surface of the substrate at a temperature below the glass transition temperature of the plastic sheet.

6. An aperture device comprising the ND filter according to claim 1.

7. A method for producing an ND filter according to claim 5, wherein said deposit film includes a Chromel layer, a silicon dioxide layer, and magnesium fluoride layer.

* * * * *